(12) United States Patent
Jin et al.

(10) Patent No.: US 9,582,807 B2
(45) Date of Patent: Feb. 28, 2017

(54) ENGAGEMENT INTERFACE ADVERTISING IN A SOCIAL NETWORK

(75) Inventors: Robert Kang Xing Jin, Palo Alto, CA (US); Jared Morgenstern, Manhattan, NY (US); Neville Bowers, Palo Alto, CA (US); Nan Gao, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 1342 days.

(21) Appl. No.: 12/390,362

(22) Filed: Feb. 20, 2009

(65) Prior Publication Data
US 2010/0217645 A1 Aug. 26, 2010

(51) Int. Cl.
G06Q 30/00 (2012.01)
G06F 3/00 (2006.01)
G06Q 30/02 (2012.01)
G06Q 10/10 (2012.01)
G06Q 50/00 (2012.01)

(52) U.S. Cl.
CPC .............. *G06Q 30/02* (2013.01); *G06Q 10/10* (2013.01); *G06Q 30/0245* (2013.01); *G06Q 30/0251* (2013.01); *G06Q 30/0277* (2013.01); *G06Q 50/01* (2013.01)

(58) Field of Classification Search
CPC ................................ G06Q 30/02; H04L 29/06
USPC ................ 715/733, 753; 705/1, 14.49, 14.73
See application file for complete search history.

(56) References Cited

U.S. PATENT DOCUMENTS

| | | | |
|---|---|---|---|
| 6,691,155 B2 | 2/2004 | Gottfried | |
| 2005/0216300 A1* | 9/2005 | Appelman et al. | 705/1 |
| 2006/0080613 A1* | 4/2006 | Savant | 715/745 |
| 2006/0190281 A1* | 8/2006 | Kott et al. | 705/1 |
| 2006/0242581 A1* | 10/2006 | Manion et al. | 715/733 |
| 2007/0244739 A1 | 10/2007 | Soito et al. | |
| 2008/0033776 A1 | 2/2008 | Marchese | |
| 2008/0040673 A1 | 2/2008 | Zuckerberg et al. | |
| 2010/0010822 A1* | 1/2010 | Bal et al. | 705/1 |

OTHER PUBLICATIONS

U.S. Patent Office, Final Office Action, U.S. Appl. No. 13/620,302, Feb. 13, 2013, twenty-three pages.

* cited by examiner

*Primary Examiner* — Sun Li
(74) *Attorney, Agent, or Firm* — Fenwick & West LLP

(57) ABSTRACT

A social network advertises to its members with engagement interfaces. An engagement interface comprises a call to action and a link to perform the action within the social network from within the engagement interface. Responsive to a user selection of the link to perform the action, the engagement interface modifies one or more objects within the social network associated with the call to action according to the selection of the link to perform the action. The engagement interface may be refreshed on the user's screen to indicate to the user that the action has been performed. An engagement interface may also be presented to a user from the social network or from an external system apart from the social network.

28 Claims, 11 Drawing Sheets

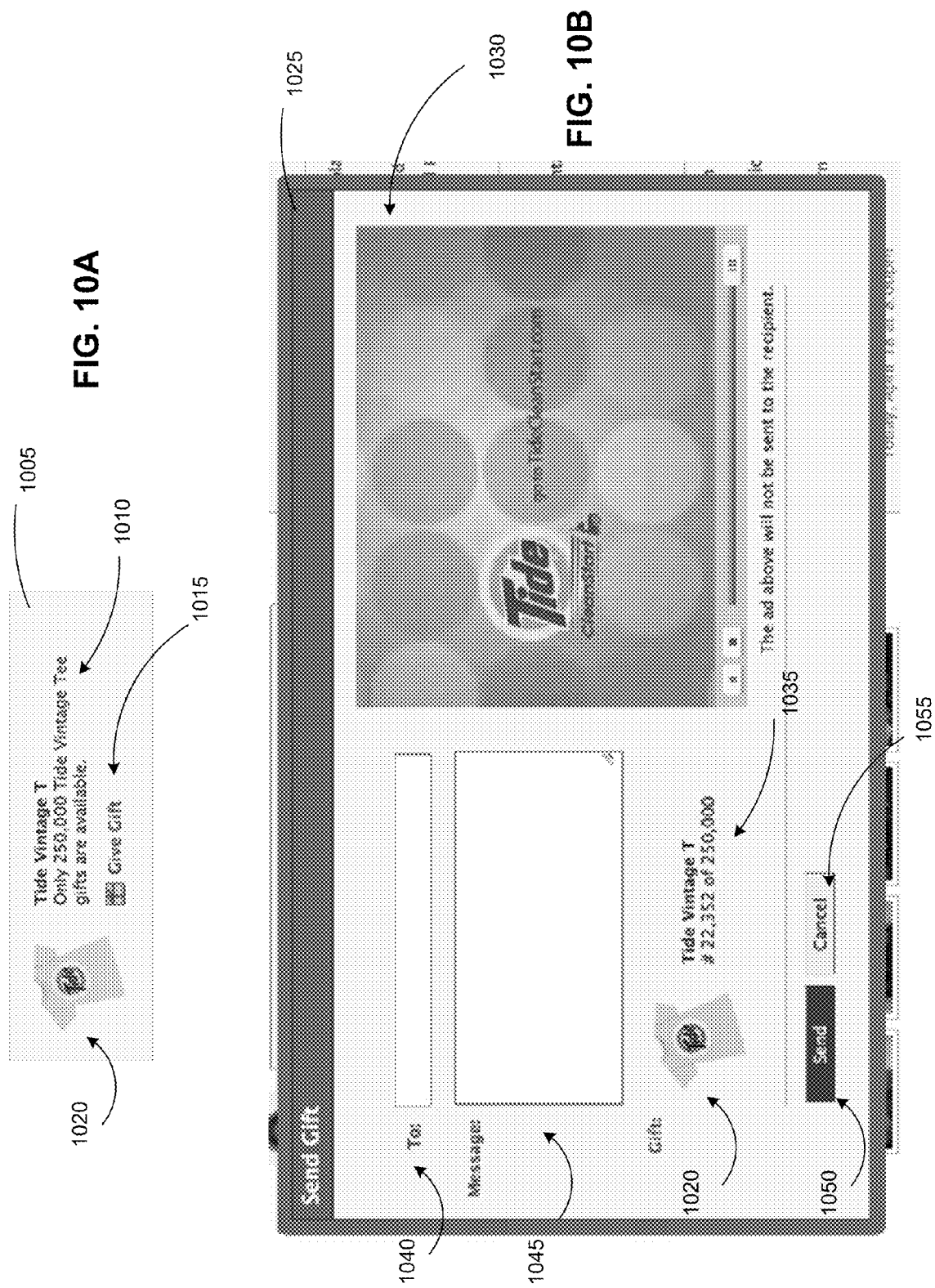

ENGAGEMENT INTERFACE ADVERTISING IN A SOCIAL NETWORK

FIELD OF THE INVENTION

This invention relates to social networking and, in particular, to advertising to users of a social network.

BACKGROUND

Social networks, or social utilities that track and enable connections between members (including people, businesses, and other entities), have become prevalent in recent years. In particular, social networking websites allow members to communicate more efficiently information that is relevant to their friends or other connections in the social network. Social networking websites typically incorporate a system for connecting members to content that is likely to be relevant to each member. For example, members may be grouped according to one or more common attributes in their profiles, such as geographic location, employer, job type, age, music preferences, interests, or other attributes. Members of the social networking website or external parties can then use these groups to customize or target information delivery so that information that might be of particular interest to a group can be communicated to that group.

Advertisers have attempted to leverage this information about members, targeting their ads to members whose interests best align with the ads. For example, a social networking website may display banner ads for a concert to members who include an affinity for the performing band in their website profile and live near a concert venue where that band might be performing. However, these attempts are no different than targeting of ads that exist in many other contexts. Traditional methods of online advertising, such as banner ads that provide a link to an external website, disrupt the user experience of a social networking website. As a result, banner ads remain an ineffective method of targeting users. Advertisers have not yet been able to engage users of social networking websites in a meaningful way to present their advertising message to consumers.

SUMMARY

To present advertising that is more effective than traditional targeted online advertising, advertisers use a type of advertisement that allows a member of a social network to interact with the advertisement. In one embodiment, the advertisement includes an "engagement interface" that comprises a call to action and a link to perform the action within the social network. Embodiments of the invention allow advertisers to engage members of a social network by allowing them to take actions that modify objects within the social network. A member intuitively interacts with the engagement interface of the advertisement because the call to action emulates the actions are regularly performed within the social network by users outside of the context of an advertisement.

In one embodiment of a method for advertising with an engagement interface to members of a social network, a social network receives a plurality of engagement interfaces to be presented to members of a social network, where each engagement interface comprising a call to action and a link to perform the action within the social network from within the engagement interface. Then, responsive to a request for a web page from a member of the social network via a member device, the social network selects an engagement interface to present to the member and sends a webpage comprising the selected engagement interface to the member device. The engagement interface is operable to modify at least one object within the social network in response to a user selection of its call to action. If the user selects the call to action, the social network modifies one or more objects in the social network that are associated with the engagement interface according to the particular user selection of the link.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIGS. 10A-B illustrate phases of an engagement interface, including a pop-up window shown responsive to a selection of the link to perform the action, in accordance with an embodiment of the invention.

Figure 1:
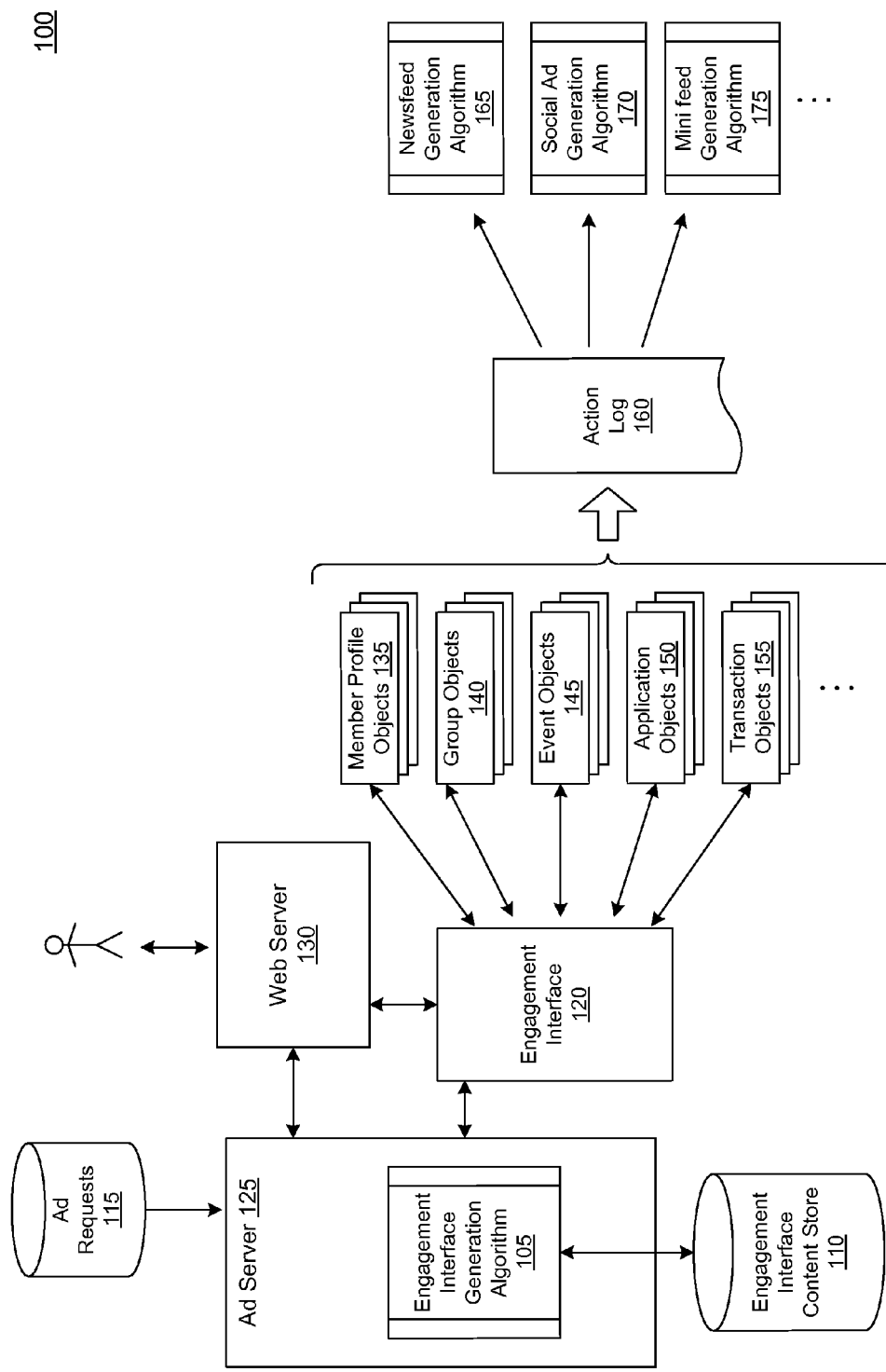
FIG. 1 is a high-level block diagram illustrating the creation of engagement interfaces and the interactions between the member and the engagement interface and between engagement interfaces and objects within a social network, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Engagement Interface Advertising to Members of a Social Network

A social networking website offers its members the ability to communicate and interact with other members of the website. In use, members join the social networking website and then add connections to a number of other members to whom they desire to be connected. As used herein, the term "friend" refers to any other member to whom a member has formed a connection, association, or relationship via the website. Connections may be added explicitly by a member, for example, the member selecting a particular other member to be a friend, or automatically created by the social networking site based on common characteristics of the members (e.g., members who are alumni of the same educational institution). Connections in social networking websites are usually in both directions, but need not be, so the terms "member" and "friend" depend on the frame of reference. For example, if Bob and Joe are both members and connected to each other in the website, Bob and Joe, both members, are also each other's friends. The connection between members may be a direct connection; however, some embodiments of a social networking website allow the connection to be indirect via one or more levels of connections. Also, the term friend need not require that members actually be friends in real life, (which would generally be the case when one of the members is a business or other entity); it simply implies a connection in the social network.

In addition to interactions with other members, the social networking website provides members with the ability to take actions on various types of items supported by the website. These items may include groups or networks (where "networks" here refer not to physical communication networks, but rather social networks of people) to which members of the website may belong, events or calendar entries in which a member might be interested, computer-based applications that a member may use via the website, and transactions that allow members to buy or sell items via the website. These are just a few examples of the items upon which a member may act on a social networking website, and many others are possible.

Engagement interfaces take advantage of the numerous actions that can be performed within a social network, allowing advertisers to maximize brand impressions while engaging members without disrupting the social networking experience. This mode of advertising is more effective than traditional banner ads because members are more likely to pay attention to an advertisement that mimics the social networking experience. For example, a social network may allow a member to comment on a newsfeed story that was posted by one of his friends. The comment would modify the newsfeed story object so that friends of the member would be able to see the member's comment. An engagement interface mimics this functionality by allowing the member to comment on the engagement interface itself. Instead of taking the member away from the social networking website, like traditional banner ads, members perform actions within the social network when engaging with engagement interfaces. Additionally, the comment would modify the engagement interface so that friends would be able to see the member's comment. Thus, advertisers can maximize the benefit of a member's expected experience with the social networking website beyond simple targeting of ads that merely chase product demand.

FIG. 1 illustrates a process of presenting engagement interfaces to users of a social networking website 100. A typical advertisement generation process in the state of the art uses well-known techniques of applying targeting criteria in online advertising to select a member of a social network to present an engagement interface. An ad server 125 triggers an engagement interface generation algorithm 105 to retrieve engagement interface content from an engagement interface content store 110 to generate an engagement interface 120. The engagement interfaces may include, for example, a multimedia preview trailer of an upcoming movie, a comment field to comment on the preview trailer, and/or a request to add an event sponsored by an advertiser to the member's calendar. Engagement interfaces 120 may be created by advertisers independently or by an application within the social network.

FIG. 1 further illustrates a process in which a member of a social networking website 100 interacts with an engagement interface. An ad server 125 uses an engagement interface generation algorithm 105 to generate engagement interfaces 120 targeted to members as specified in the ad request. Each generated engagement interface 120 comprises a call to action and a link to perform the action within the social network. Responsive to a selection of the link, the engagement interface 120 may modify a number of objects in a social networking website 100 associated with the call to action, including member profile objects 135, group objects 140, event objects 145, application objects 150, and transaction objects 155. After the object(s) within the social network have been modified, the engagement interface 120 is refreshed to indicate that the action was successful.

As FIG. 1 shows, the action taken by the member may be logged in an action log 160. By recording these actions in the action log 160, the actions may be transformed by a newsfeed generation algorithm 165, a social ad generation algorithm 170, a mini feed generation algorithm 175, and other algorithms that compile the actions of members in the social network. In this way, an engagement interface may be distributed organically to the members of the social network through the friends of the member who performed the action within the engagement interface 120. The "social" aspects of advertising within a social network are described further in a related application, "Communicating Information in a Social Networking Website About Activities from Another Domain," Ser. No. 12/193,705, hereby incorporated by reference.

Engagement interfaces may be created by advertisers using an application within the social network and then stored in local storage. Advertisers may select which actions a member may perform from within the engagement interface using the application. After selecting the performable actions, the engagement interface is associated with the appropriate objects within the social network in order for the selection of the link to perform the action within the engagement interface to modify the correct object.

In an alternative process, the ad server 125 may create a number of engagement interfaces in a batch process and then store the engagement interfaces in a local storage 110. This way, a set of engagement interfaces is ready to be provided for each member without having to be created in real time. This helps with the scalability of the social networking website 100, as real-time creation of engagement interfaces may be difficult for networks 100 with a large number of members and a resulting large number of requests for ads with engagement interfaces.

In addition, FIG. 1 reveals the interaction between a member and an engagement interface as well as the potential interactions between engagement interfaces and objects within a social network.

Actions in the Social Network

As illustrated, the social networking website 100 maintains a number of objects for the different kinds of items with which a member may interact on the website 100. In one example embodiment, these objects include member profile objects 135, group objects 140, event objects 145, application objects 150, and transaction objects 155 (respectively, hereinafter, profiles 135, groups 140, events 145, applications 150, and transactions 155). In one embodiment, an object is stored by the website 100 for each instance of its associated item. For example, a member profile 135 is stored for each member who joins the website 100, a group 140 is stored for each group defined in the website 100, and so on. The types of objects and the data stored for each is described in more detail below in connection with FIG. 2, which illustrates an embodiment of the social networking website 100.

A member of the social networking website 100 may take specific actions within the social networking website 100, where each action is associated with one or more objects. The type of actions that a member may perform in connection with an object is defined for each object and largely depends on the type of item represented by the object. A particular action may be associated with multiple objects. Described below are a number of examples of particular types of objects that may be defined for the social networking website 100, as well as a number of actions that can be taken for each object. These objects and the actions discussed herein are provided for illustration purposes only, and it can be appreciated that an unlimited number of variations and features can be provided on a social networking website 100.

The social networking website 100 maintains a member profile 135 for each member of the website 100. Any action that a particular member takes with respect to another member is associated with each member's profile 135. Such actions may include, for example, adding a connection to the other member, sending a message to the other member, reading a message from the other member, viewing content associated with the other member, attending an event posted by another member, among others. In addition, a number of actions described below in connection with other objects are directed at particular members, so these actions are associated with those members as well.

A group 140 may be defined for a group or network of members. For example, a member may define a group to be a fan club for a particular band. The website 100 would maintain a group 140 for that fan club, which might include information about the band, media content (e.g., songs or music videos) by the band, and discussion boards on which members of the group can comment about the band. Accordingly, member actions that are possible with respect to a group 140 might include joining the group, viewing the content, listening to songs, watching videos, and posting a message on the discussion board.

Similarly, an event 145 may be defined for a particular event, such as a birthday party. A member may create the event 145 by defining information about the event such as the time and place and a list of invitees. Other members may accept the invitation, comment about the event, post their own content (e.g., pictures from the event, audio and/or video from the event), and perform any other actions enabled by the social networking website 100 for the event 145. Accordingly, the creator of the event 145 as well as the invitees for the event may perform various actions that are associated with that 145.

The social networking website may also enable members to add applications to their profiles. These applications provide enhanced content and interactivity within the social networking website 100, which maintains an application object 150 for each application hosted in the system. The applications may be provided by the website operator and/or by third party developers. An example application is an enhanced messaging service, in which members can send virtual objects (such as a "gift" or "flowers") and an optional message to another member. The use of any functionality offered by the application may thus constitute an action by the member in connection with the application 150. In addition, continuing the example from above, the receipt of the virtual gift or message may also be considered an action in connection with the application 150. It can therefore be appreciated that actions may be passive and need not require active participation by a member.

Another type of object shown in the example of FIG. 1 is a transaction object 155. A transaction object enables members to make transactions, such as buying, selling, renting, trading, or exchanging with other members. For example, a member may post a classified ad on the social networking website 100 to sell a car. The member would thus define a new transaction 155, which may include a description of the car, a picture, and an asking price. Other members can then view this information and possibly interact further with the transaction 155 by posting questions about the car and accepting the offer or making a counteroffer. Each of these interactions—view, question posting, offer, and counteroffer—are actions that are associated with the particular transaction 155.

When a member takes an action on the social networking website 100, the action is recorded in an action log 160. In one embodiment, the website 100 maintains the action log 160 as a database of entries. When an action is taken on the website 100, therefore, the website 100 adds an entry for that action to the log 160.

After an amount of time, the action log 160 will become populated with a number of entries that describe actions taken by the members of the social networking website 100. The action log 160 thus contains a very rich set of data about the actions of the members, and can be analyzed and filtered to identify trends and relationships in the actions of the members, as well as affinities between the members and various objects. Advertisers may target members with engagement interfaces using these trends, relationships, and affinities, while also recording new actions based on a selection of the link within the engagement interface. Thus, engagement interfaces enable a member to experience multiple aspects of the social networking website from within the engagement interface.

System Architecture

Figure 2:
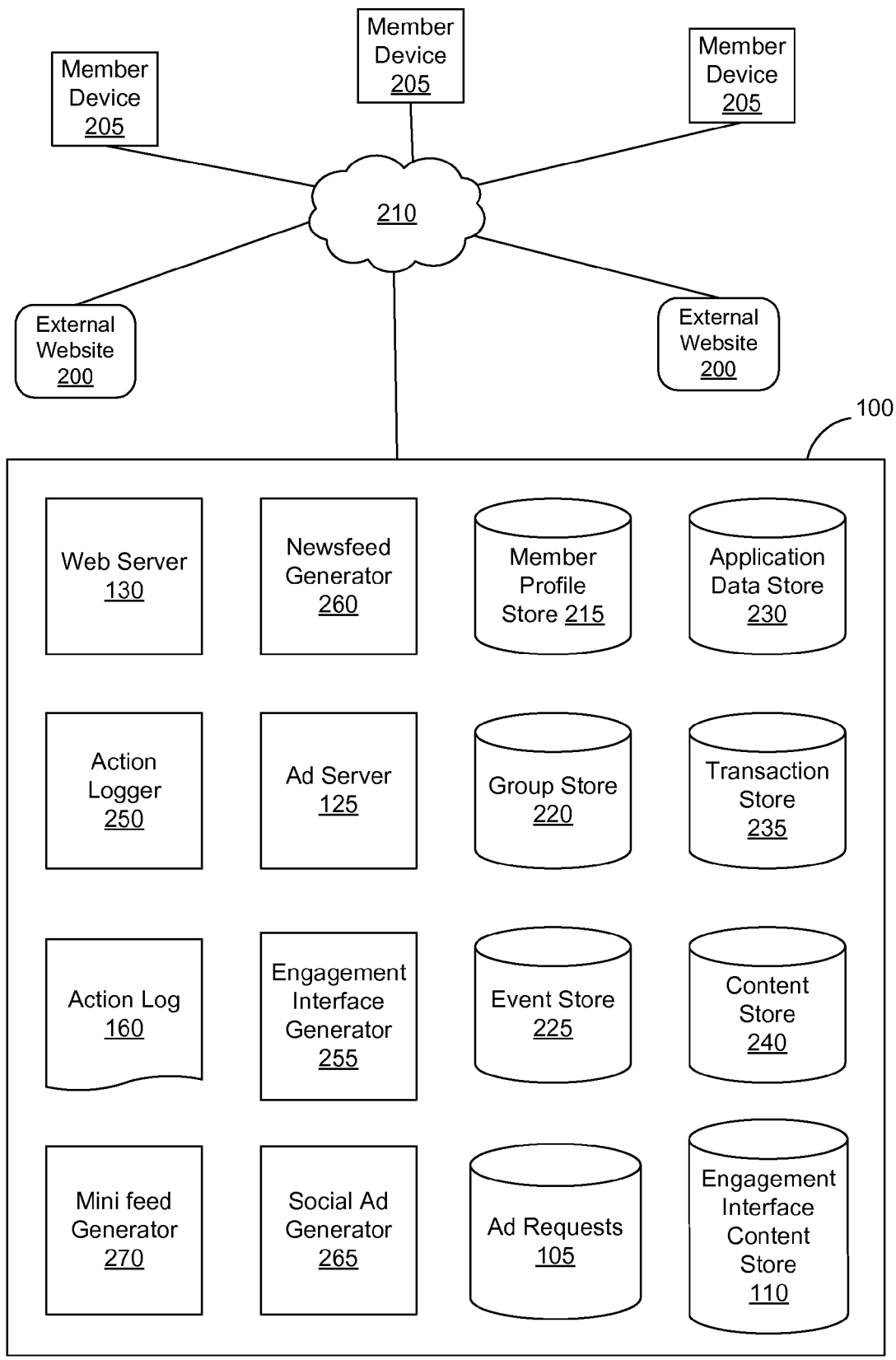
FIG. 2 is a network diagram of a system for providing engagement interfaces to members of a social networking website, showing a block diagram of the social networking website, in accordance with an embodiment of the invention.

FIG. 2 is a high level block diagram illustrating a system architecture suitable for operation of a social networking website 100. The system environment comprises one or more member devices 205, one or more external websites 200, a social networking website 100, and a network 210. In alternative configurations, different and/or additional modules can be included in the system.

The member devices 205 comprise one or more computing devices that can receive member input and can transmit and receive data via the network 210. For example, the member devices 205 may be desktop computers, laptop computers, smart phones, personal digital assistants (PDAs), or any other device including computing functionality and data communication capabilities. The member devices 205 are configured to communicate via network 210, which may comprise any combination of local area and/or wide area networks, using both wired and wireless communication systems. A member device 205 is presented with an engagement interface 120 on the social networking website 100. Additionally, an engagement interface 120 on the social networking website 100 may provide a link to an external website 200 in addition to the call to action and the link to perform the action within the social network.

FIG. 2 further illustrates a block diagram of a social networking website 100. The social networking website 100 includes a web server 130, an action logger 250, an action log 160, a mini feed generator 270, a newsfeed generator 260, an ad server 125, an engagement interface generator 255, a social ad generator 265, a member profile store 215, a group store 220, an event store 225, a database of ad requests 105, an application data store 230, a transaction store 235, a content store 240, and an engagement interface content store 110. In other embodiments, the social networking website 100 may include additional, fewer, or different modules for various applications. Conventional components such as network interfaces, security mechanisms, load balancers, failover servers, management and network operations consoles, and the like are not shown so as to not obscure the details of the system.

The social networking website 100 comprises a computing system that allows members to communicate or otherwise interact with each other and access content as described herein. The social networking website 100 stores member profiles that describe the members of a social network, including biographic, demographic, and other types of descriptive information, such as work experience, educational history, hobbies or preferences, location, and the like. The website 100 further stores data describing one or more relationships between different members. The relationship information may indicate members who have similar or common work experience, group memberships, hobbies, or educational history. Additionally, the social networking website 100 includes member-defined relationships between different members, allowing members to specify their relationships with other members. For example, these member defined relationships allows members to generate relationships with other members that parallel the members' real-life relationships, such as friends, co-workers, partners, and so forth. Members may select from predefined types of relationships, or define their own relationship types as needed.

The web server 130 links the social networking website 100 via the network 210 to one or more member devices 205, as well as to one or more external websites 200. The web server 130 may include a mail server or other messaging functionality for receiving and routing messages between the social networking website 100 and the member devices 205 or external websites 200. The messages can be instant messages, queued messages (e.g., email), text and SMS messages, or any other suitable messaging technique.

The action logger 250 is capable of receiving communications from the web server 130 about member actions on and/or off the social networking website 100. The action logger 250 populates the action log 160 with information about these member actions tracked in the log 160.

The newsfeed generator 260 and the mini feed generator 270 generate communications for each member about information that may be relevant to the member. These communications may take the form of stories, and each story is an informational message comprising one or a few lines of information about an action in the action log that is relevant to the particular member. The stories are presented to a member via one or more pages of the social networking website 100, for example in each member's home page or newsfeed page.

The ad server 125 performs the engagement interface generation algorithm 105 discussion above. The operation of the ad server 125 is described in more detail below in connection with FIG. 3. The ad server 125 is communicatively coupled to the database of ad requests 105 and to the web server 130 for this purpose.

As discussed above, the social networking website 100 maintains data about a number of different types of objects with which a member may interact on the website 100. To this end, each of the member profile store 215, the group store 220, the event store 225, the application data store 230, and the transaction store 235 stores a data structure to manage the data for each instance of the corresponding type of object maintained by the website 100. The data structures comprise information fields that are suitable for the corresponding type of object. (For example, the event store 225 contains data structures that include the time and location for an event, whereas the member profile store 215 contains data structures with fields suitable for describing a member's profile.) When a new object of a particular type is created, the website 100 initializes a new data structure of the corresponding type, assigns a unique object identifier to it, and begins to add data to the object as needed. This might occur, for example, when an advertiser defines a new event associated with a call to action in an engagement interface, wherein the website 100 would generate a new instance of an event in the event store 225, assign a unique identifier to the event, and begin to populate the fields of the event with information provided by the advertiser and, subsequently as the engagement interface is implemented, by members.

Presentation of an Engagement Interface to a User

Figure 3:
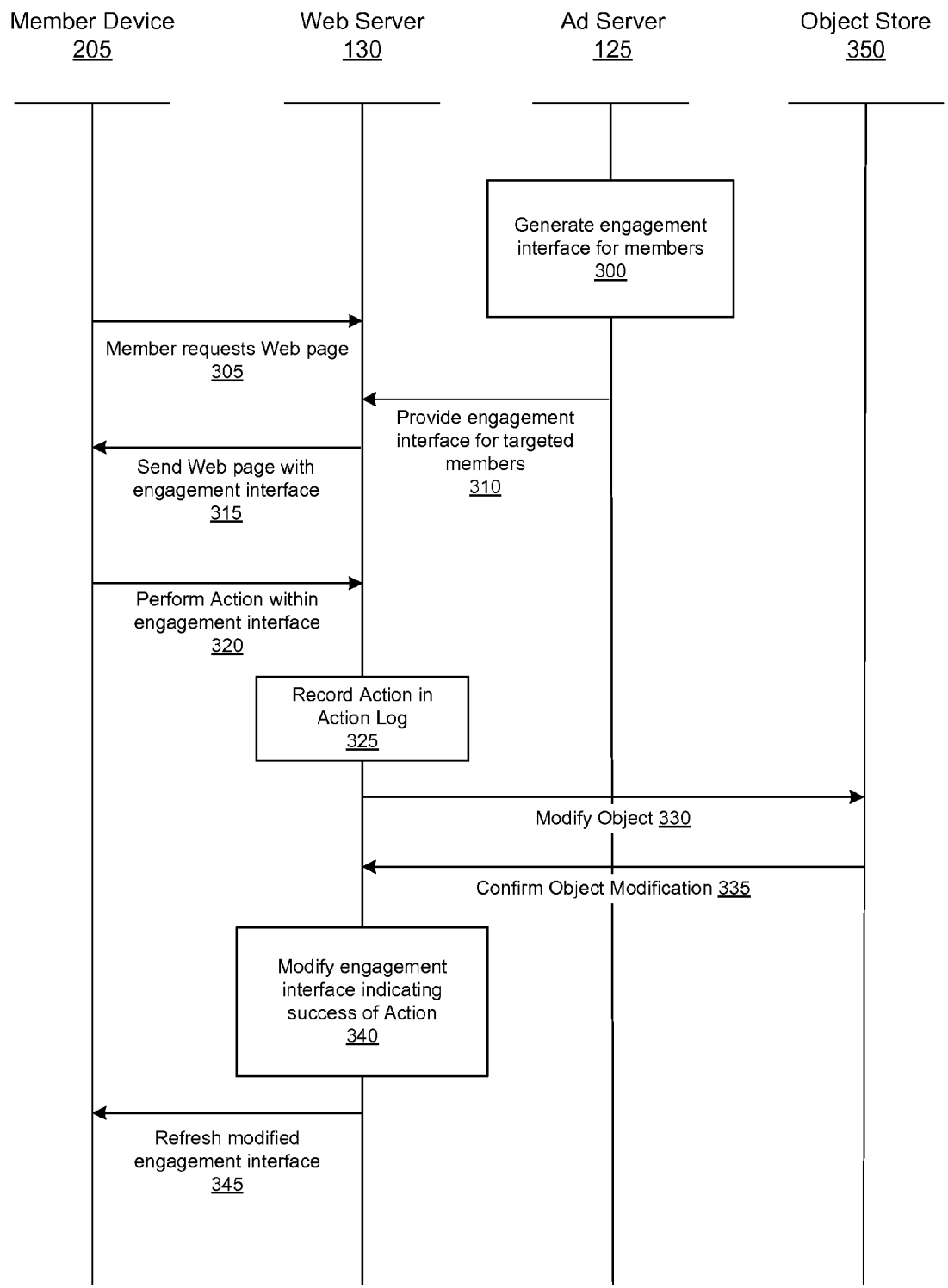
FIG. 3 is an interaction diagram of a process for modifying objects within a social network from within an engagement interface, in accordance with an embodiment of the invention.

FIG. 3 illustrates a process showing how the social network may present an engagement interface to a user and how the user may interact with the engagement interface. In a first step, an ad server 125 generates 300 an engagement interface 120 for members, as illustrated above in FIG. 1. Either before or after a member requests 305 a web page from a member device, the ad server 125 provides 310 the engagement interface 120 to a web server 130. The web server 130 then sends 315 the requested web page with the engagement interface 120 to a member device 205. The member is thus presented with a call to action and a link to perform the action, which are both contained in the engagement interface 120. This engagement interface advertisement may be paid for by an advertiser and may include additional information about that advertiser, its products, and/or its services.

After the member is presented with the engagement interface 120, the member device 205 may be used to perform 320 an action within the engagement interface 120 wherein the member makes a selection of the link to perform the action. Engagement interfaces 120 are paid for by advertisers to encourage members to interact with the advertisers' message and brand by eliciting actions within the engagement interface. Various types of actions may be performed within the engagement interface 120 on the objects discussed above depending on the call to action provided in the engagement interface 120. The performed action may be recorded 325 by the web server 130 in an action log 160 to enable member actions taken via the engagement interface 120 to spread organically to friends in the social network via algorithms that use the action log. These algorithms may include, without limitation, the newsfeed generation algorithm 165, the social ad generation algorithm 170, and the mini feed algorithm 170, illustrated in FIG. 1 and described above.

Next, the web server 130 modifies 330 an object or objects associated with the performed action in an object store 350. For example, if the engagement interface 120 requested the member to add a midnight movie showing and the member performed the action, "Add to My Events," a member profile object 135 associated with the member would be modified 330 by the web server 130 responsive to the performed action within the engagement interface. The object store 350 manages the objects within the social network. In this example, the web server 130 may also modify 330 an event object 145 that is associated with the midnight movie showing, in accordance with the selection of the link to perform the action, for example, to add the member to the list of attendees of the movie showing.

The object store 350 then confirms 335 the modification(s) to the web server 130 to the objects the associated with the action. The web server 130 may also modify 340 the engagement interface 120 to display an indication that the action was successfully performed on the objects in the social network. Finally, the web server 130 refreshes 345 the web page with the modified engagement interface 120 on the member device 205. In this way, multiple objects in the social network are modified by the selection of the link to perform the action with the engagement interface.

Figure 4A:
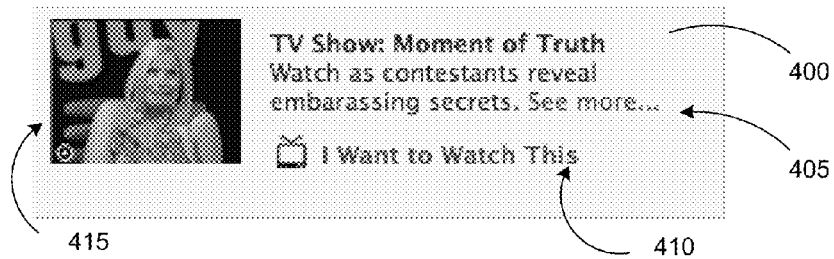
FIGS. 4A-D are examples of engagement interfaces requesting a member to perform various actions on objects within a social network, in accordance with embodiments of the invention.
Figure 4B:
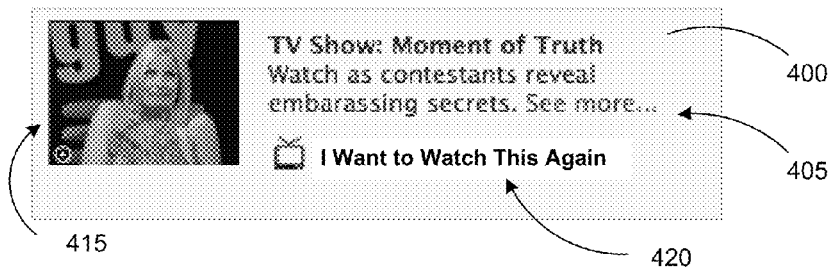

Described in more detail below, FIG. 4A is an example of an engagement interface presented on a web page to a member. In the engagement interface depicted in the region 400, the engagement interface comprises a call to action 405 that invites the member watch as contestants reveal embarrassing secrets and a link 410 to express the desire to watch it. FIG. 4B shows the refreshed engagement interface 400, which includes an indication 420 that the action has been successfully performed. The engagement interface, in this example, may modify multiple objects, including a wish list object and affinity for the content described, that are associated with the action performed.

Generally, advertisers may select any number of actions to be performed in the social network from within the engagement interface via links to perform the actions. The selection of the link to perform the action modifies the specific objects associated with the call to action in accordance with the selection. Types of actions that may be performed from within the engagement interface include, but are not limited to, attending an event; becoming a fan of an entity in the social network; commenting on something, such as a picture or another user's action; giving currency, real or virtual; posting on a public wall; expressing a desire to do something; playing a game with a friend; playing audio and/or video in an engagement interface; rating a product described in an ad; answering a poll question; uploading a photo, video, or audio file; expressing an affinity for an item of content; and joining a cause. Each of these actions is described in more detail below.

Figure 4C:
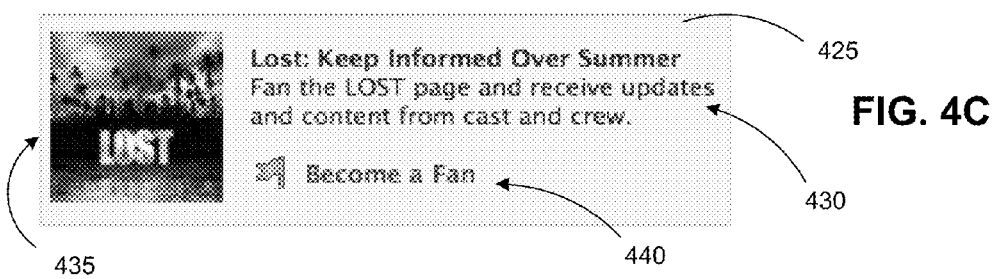
Figure 4D:
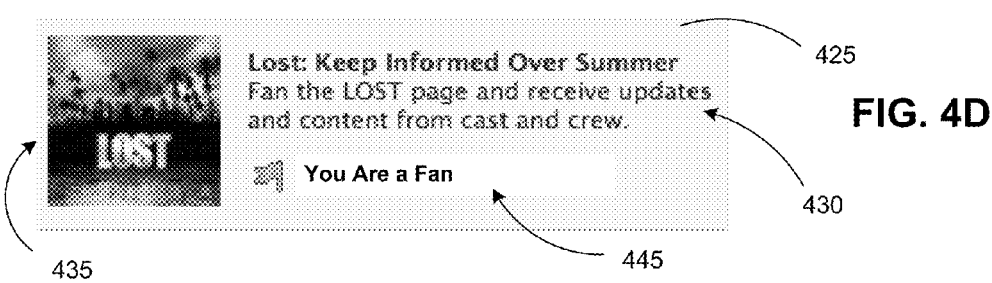

An advertiser may create a page on the social network that describes a product or brand that the advertiser wishes to promote. In generating the engagement interface, the advertiser may ask the member to "become a fan" of the page created for that specific product. The member would only need to click once on the request to "become a fan" of the advertised product. For example, in FIG. 4C, a television network may want to advertise a television show by making a page for the television show on the social network, where fans can receive updates and content from the cast and crew. An engagement interface 425 for the television show would include a call to action 430 for the member to "become a fan" of the television show and a link 440 to perform the action of becoming a fan. As FIG. 4D illustrates, the selection of the link modifies the associated objects and causes the engagement interface 425 for the television show to refresh with an indication 445 that the action was successful.

Figure 5A:
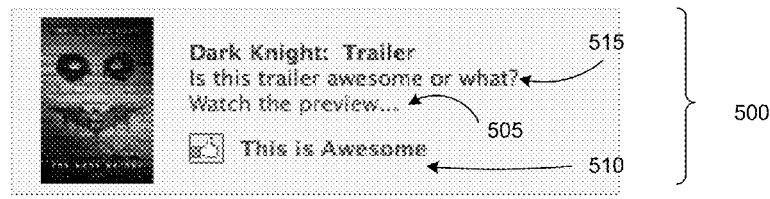
FIGS. 5A-C illustrate phases of an engagement interface, in accordance with an embodiment of the invention.

Advertisers may also include the ability for members to express their affinity or approval for an advertisement. In FIG. 5A, an engagement interface 500 is shown that has a call to action 515, asking the user "Is this trailer awesome or what?" and has a link 505 to watch the preview and another link 510 to allow the user to express an affinity for the trailer. This feedback from the targeted member about the engagement interface helps advertisers develop a more targeted audience because the advertiser receives data regarding the effectiveness of the advertisement and whether the targeting criteria should be modified. The member may select a link 510 that expresses the member's approval of the advertisement. This action from within the engagement interface may modify an application object that is associated with the engagement interface, for example, by adding the user to a list of members who have enjoyed the movie trailer. The action may also affect the member profile object of the user by changing the affinities associated with that user.

Figure 5B:
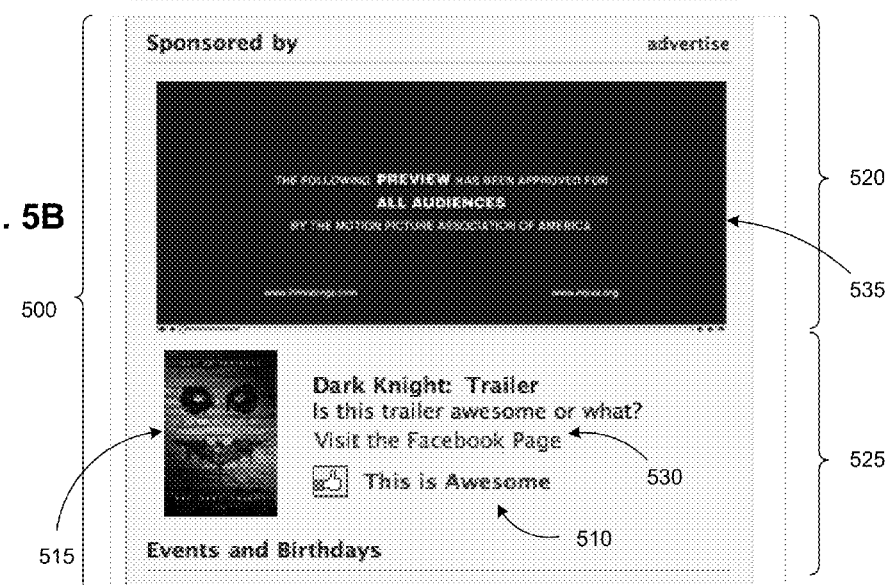
Figure 5C:
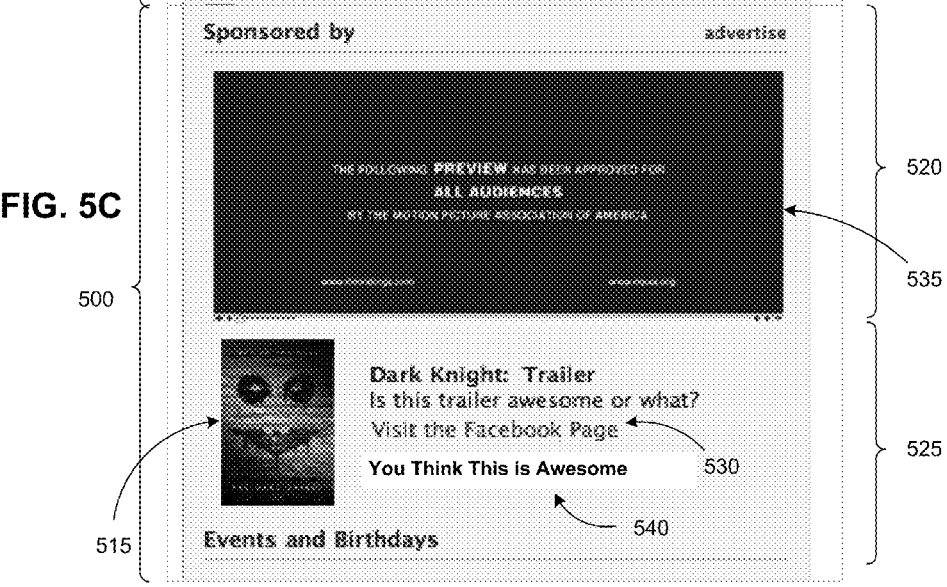

An advertiser may also enable a member to watch a movie trailer, or other audio or video related to the content of the ad. The member's action in response to the request records the member's affinity in an action log. FIGS. 5B and 5C show how the engagement interface may expand when the member selects the link watch the movie trailer through the engagement interface, allowing the member to watch the trailer without having to navigate away from the currently viewed web page. When the member selects the link for the movie trailer 505, a video pops up 520 within the engagement interface 500, playing the movie trailer 535. When the video pops up, the original link may change 530 to "Visit the Facebook Page," which may link to a web page that allows the member to purchase tickets directly through the social networking website or through a third party website. The member may also select the link 510 to express an affinity for the trailer, resulting in a change of the link to an indication 540 that the action was successfully performed, as shown in FIG. 5C. In each of these actions, the member is engaged with the engagement interface 500 because most actions occur within the engagement interface 500, or through a pop up on the same page of the social networking website, rather than a third party website. This maximizes the member's engagement with the engagement interface 500.

Advertisers may also choose to add their own audio and/or video to an engagement interface. Members of a social network are accustomed to watching videos on the social network, such that an engagement interface which mimics this functionality adds, rather than detracts, from the overall social networking experience. When an engagement interface includes a video, a frame of the video is displayed on the engagement interface and a play button on the video frame indicates that a video is available for playback, for example, as in FIGS. 5B and 5C. After the member clicks on the play button, the video frame expands to playback the video from within the engagement interface. The advertiser may wish to record the member's action by having the engagement interface modify an object that is associated with the video, such as by updating the object to indicate the number of times the video has been viewed and/or which members have viewed it.

Figure 6A:
FIGS. 6A-D are more examples of engagement interfaces requesting a member to perform other various actions on objects within a social network, in accordance with embodiments of the invention.
Figure 6B:

Additionally, audio files can be added to an engagement interface, such as a song by a music artist being promoted, so that a member may play the audio through the engagement interface. FIGS. 6A and 6B show an engagement interface 600 with a call to action 610 to play a song 610 and a link 615 to perform that action from within the engagement interface 600. When the selection of the link 615 is received, the song is played within the engagement interface 600. The engagement interface 600 may also be updated with a link 620 to indicate that the song has been played at least once already.

Figure 6C:
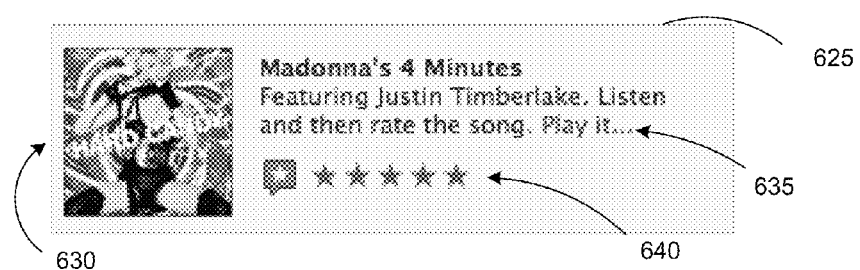
Figure 6D:
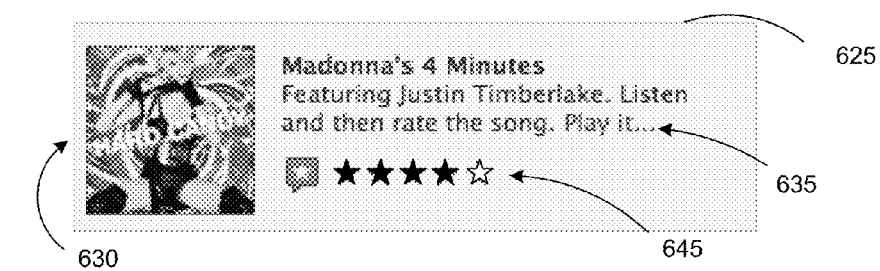

An advertiser may also include the ability for member to rate a product described in an engagement interface. For example, in FIGS. 6C and 6D, an advertiser for a song has included in the engagement interface 625 a call to action 635 to play the song and rate it as well as a link 640 for the member to rate the song, e.g., by giving the song 1 to 5 stars. Of course, the rating methodology may vary depending on the advertiser's design choice. Once the member rates the product described within the engagement interface 625, the rating link 645 of the engagement interface 625 may be updated to reflect the member's rating. The engagement interface 625 may also modify an application object associated with the engagement interface 625 to record the rating. The member profile object may also be modified to indicate whether the member liked the product described in the engagement interface 625. In this way, the advertiser is able to receive focus group data about the product while also increasing the number of brand impressions by using the rating feature from within the engagement interface.

Additionally, the advertiser may enable the engagement interface to compile other members' ratings of the product and then distribute the ad to members of the social network who are likely to have a high affinity for the ad's content. If, as an example, numerous friends of a member have rated the same song with four or five stars, that member may be targeted to receive that engagement interface.

Figure 7A:
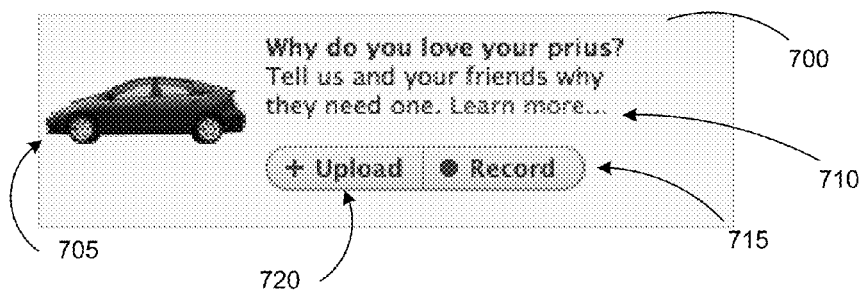
FIGS. 7A-D are more examples of engagement interfaces requesting a member to perform other various actions on objects within a social network, in accordance with embodiments of the invention.
Figure 7B:

Members of a social network frequently upload photos, videos and audio files to the social network to share with friends. Advertisers can mimic this functionality by allowing members to upload photos, videos, and audio files via an engagement interface. For example, in FIGS. 7A and 7B, a car company may wish to advertise a new car 705 by requesting members to record a message 710 from the user about why the member loves the car. The ability to upload a media file 720 or record a message 715 directly from the engagement interface 700 makes the advertisement more personal and makes it more likely that a message will be recorded, thus maximizing the engagement of the member with the engagement interface 700. The engagement interface 700 may modify the application object to store the photo, video, or audio file uploaded by the member and provides an indication 725 that the file has been received and uploaded. Once a message is uploaded, the engagement interface may be updated to indicate that fact and to preview the message via link 725, as shown in FIG. 7B.

Figure 7C:
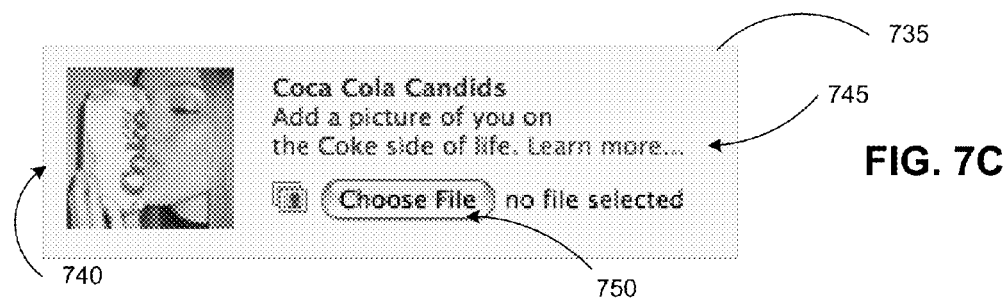
Figure 7D:

In addition, an engagement interface may allow members to upload photos in a similar manner. FIGS. 7C and 7D depict an embodiment of such an engagement interface 735, in which the call to action 745 requests the member to add a picture related to the content of the advertisement. The engagement interface 735 also provides a link 750 to perform the upload action. After the member uploads the file successfully, an indication 755 is shown on the engagement interface.

An advertiser may include in the engagement interface a request for the member to add an event to the member's calendar, which is maintained by the social network. This event may exist in the real world, or it may be a virtual event and/or exist only within the social network. The action 815 associated with the engagement interface 800 would allow the member to RSVP for the event, asking the member to indicate that the member is attending, not attending, or may attend. For example, movie producers may wish to advertise a showing of a new movie in theaters on a specific date. The engagement interface may thus comprise a call to action 805 to add the movie showing to the member's calendar and a link 815 to perform the action. Once the member has added the event to the member's calendar, the engagement interface 800 may be updated to provide an indication 820 that the event has been added to the member's calendar.

Figure 8A:
FIGS. 8A-D are more examples of engagement interfaces requesting a member to perform other various actions on objects within a social network, in accordance with embodiments of the invention.
Figure 8B:
Figure 8C:
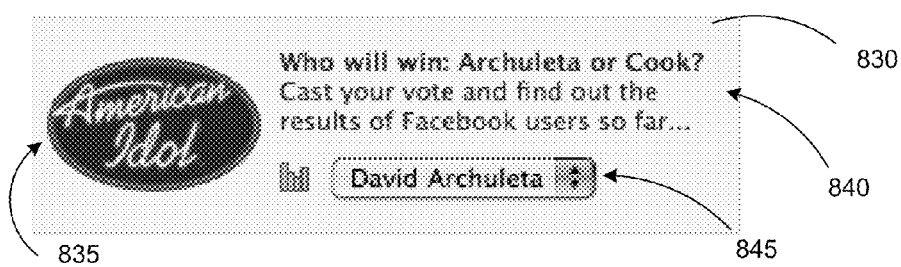
Figure 8D:
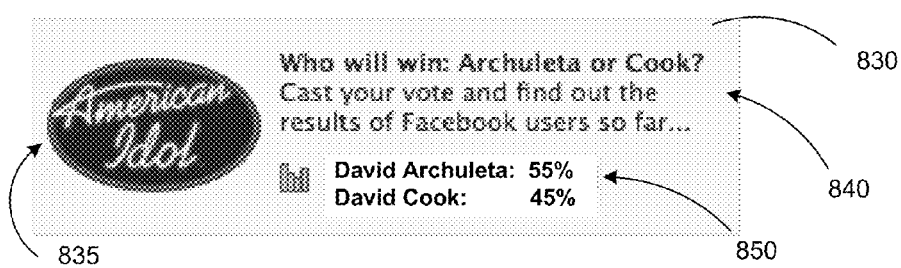

Advertisers may also post a poll question and answers in an engagement interface. For example, as shown in FIGS. 8C and 8D, a television network may advertise a television show and generate interest in the show using an engagement interface 830 that asks members to answer a question about the show, as in the call to action 840. A drop down menu 845 may provide the member a link to perform the action of answering the question. After the member responds to the poll by selecting a choice, the poll data may be retrieved in real time to display the results 850. The member's action within the engagement interface 830 of answering the questions, for example, may modify the application object that is associated with the poll created by the advertiser. The member's profile object would also be modified to indicate the member's interest in content associated with the selected answer. Also, a poll answer object, created by the application object associated with the poll, may be modified to accumulate the responses from members across the social network.

Additionally, the polling data may also be grouped by the member's friends who also responded to the poll. In such a case, the engagement interface 830 may display the poll data filtered through the member's friends' responses (e.g., "5 friends think that David Archuleta will win and 10 friends think that David Cook will win!").

Figure 9A:
FIGS. 9A-D are more examples of engagement interfaces requesting a member to perform other various actions on objects within a social network, in accordance with embodiments of the invention.
Figure 9B:

One of the basic actions on a social network is comment on something by a member of the social network. Members comment on newsfeed stories, photos, videos, and gifts, among other objects in the social network. One of the benefits of commenting is its social aspect. Once the member has been commented on something, friends of the member can view that member's comment and respond with their own comment as well. This type of conversation is frequent on a social network. An advertiser may include this functionality in an engagement interface to allow members and their friends to comment on the content of the engagement interface 900, as illustrated in FIGS. 9A and 9B. In this example, a comment field 915 is displayed within the engagement interface 900 for a new video game product. After a member enters text in the field 915, the engagement interface 900 is refreshed with an indication 920 that the action was performed successfully, e.g., showing the comment, as shown in FIG. 9B.

This commenting functionality increases the engagement of the member with the engagement interface 900 because of the ability for the ad to host a number of comments from the member and the member's friends. Thus, the social aspect of commenting enables the engagement interface to distribute organically through "word of mouth." This is enhanced when the member's action of commenting on the subject matter of the engagement interface 900 is reported in other places in the social network, such as in the member's mini-feed or in the member's friends' newsfeed. Besides the social nature of commenting, the advertiser may select the best caption to display on the advertisement or somewhere else of significance, such as an external website or a fan page for the product.

Figure 9C:
Figure 9D:

Generally, playing a game with a friend on a social network can dramatically increase the amount of time the member spends with the social network. As a result, advertisers may include playing a game with a friend within an engagement interface to maximize engagement with the advertisement, as shown in FIGS. 9C and 9D. An advertiser may create a game application on the social network so that the application object is modified when the member starts playing the game with a friend. The engagement interface 930 may comprise a call to action 935 for playing the game and a link 945 to perform the action of playing the game online with a friend who is also online now through the engagement interface. Alternatively, the advertiser may develop a game on a third party website and upload the game as an application on the social network or link to the game on the third party website. FIG. 9D illustrates an indication 950 that the action was successful, e.g., that the game has been played and can be played again.

While actual physical currency may or may not exist on a social network, virtual currency may exist, such as in the form of gifts or units of "karma." An advertiser may sponsor giving gifts from within an engagement interface that is related to the product or message that the advertiser wishes to convey. For example, in FIGS. 10A and 10B, an advertiser sponsors giving gifts from within an engagement interface 1005, which comprises a call to action 1010 indicating that a limited number of gifts are available and a link 1015 to perform the action of giving a gift to a friend. The currency may be limited in nature (e.g., the sponsor giving away a limited number of gifts), or it may be unlimited. As shown in FIG. 10B, the selection of the link 1015 causes a modification of the engagement interface 1005 or a new popup window 1025 to display on the same web page. In this example, the new interface comprises a video commercial 1030, a destination field 1040, a message content field 1045, a send button 1050, and a cancel button 1055. Using this interface, a member can send a gift along with a short message to the member's friends in the social network. This functionality of giving gifts increases the engagement of the member by creating scarcity in an item and sponsoring the gifting of the item to a friend, thereby increasing the number of brand impressions at least twofold. The popup window 1025 operates as another type of engagement interface because the member must click on the send button 1050 to modify the objects associated with the call to action 1035.

Figure 11A:
FIGS. 11A-B is another example of an engagement interface, in accordance with an embodiment of the invention.
Figure 11B:

Giving units of virtual currency may work in a similar fashion, except the virtual currency may be a type of currency unrelated to a specific product and may exist only on the social network. In FIGS. 11A and 11B, an engagement interface 1105 is shown where the advertiser sponsors 1115 sending virtual currency to friends as a call to action 1110. The advertiser may pay the social network in exchange for allowing members to give the virtual currency. After entering a friend's name in the text field 1120, the engagement interface 1105 refreshes to show an indication 1125 that the action has been successfully performed.

The member's action would modify the gift object to reduce the number in supply (if applicable) and modify the members' profile objects to indicate that the gift was given and received. Along with giving gifts/karma, an advertiser may include the functionality to post a gift on a public wall. The functionality of posting a gift to a member's wall increases the number of brand impressions because friends and other members of the social network would view that gift on the member's wall. The gift would appear on the friend's wall upon receipt, posted publicly. The engagement interface thus modifies the profile object of both the friend and the member sending the gift.

Figure 11C:
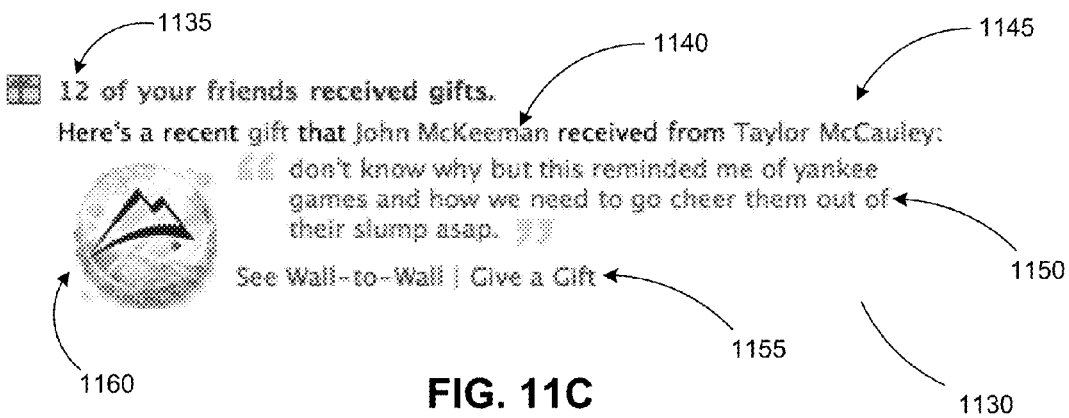
FIGS. 11C-D is an example of a social ad comprising an engagement interface displayed as a newsfeed story indicating how many friends have received a gift sponsored by an advertiser, in accordance with an embodiment of the invention.
Figure 11D:
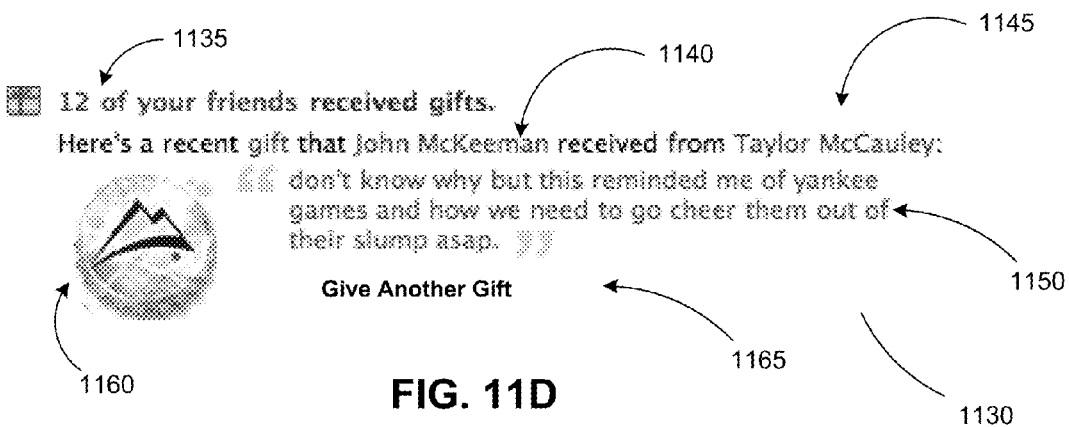

In FIGS. 11C and 11D, an advertisement 1145 displays an engagement interface 1160 that shows an image of a gift, which may relate to a product being advertised. This example advertisement 1145 communicates to the member that one of the member's friends, John McKeeman 1140, received a gift from a friend, Taylor McCauley 1145. The newsfeed story 1130 comprises an engagement interface 1160 that includes a call to action 1150 in the form of a comment and a link 1155 to perform the action of giving a gift. FIG. 11D shows the indication 1165 that the gift has been given.

Advertisers can also enable members to join a cause in which the advertiser supports by requesting the member to perform some action within the engagement interface that triggers a donation to a cause described in the engagement interface. For example, the profits from a particular product line of a company may be donated to a charity or other nonprofit organization. An engagement interface may enable a member to donate to the nonprofit organization and receive a gift related to that organization or donation. The member's action to donate may trigger a popup window within the engagement interface or within the page where the engagement interface is posted. The donation modifies the page object that tracks the amount of money raised and number of members donating to the cause. In addition, a member may join a cause directly from the engagement interface, regardless of whether an actual donation is given. The cause would also modify the member's profile object to indicate membership in the cause. This method of advertising is beneficial because the member is able to post the cause his or her profile, thereby increasing the brand impressions of the sponsor.

Engagement Interface Advertising through Social Connections within a Social Network "Interactive social ads," or engagement interfaces that utilize social aspects of the social network, allow advertisers to leverage one member's actions to promote specific content to others who might be interested in that information—not only because they might have similar interests, but also because of their connection with the member. This mode of advertising may be more effective because members are more likely to be influenced to respond to an advertiser's message in the presence of information that their friends or other connections have also taken an action related to the advertiser. Interactive social ads thus allow advertisers to enjoy the credibility that consumers naturally give to their friends through word of mouth advertising.

In one embodiment, a process for generating engagement interfaces is used for a social networking website 100 that also publishes information to its members about the actions of other members to whom the members are connected, in this case, friends. This information published to members about their friends outside the context of the engagement interfaces is provided in the form of short newsfeed stories (information messages) about the members' friends. The newsfeed stories are displayed to a member on a member's home page, for example. For each member, the website 100 is configured to generate a personalized set of newsfeed stories and engagement interfaces that are likely to be relevant to the member. Although described in the newsfeed context, in other embodiments the engagement interfaces may be generated by the website 100 and published to members in a website 100 that does not use newsfeed stories or publishes the engagement interfaces outside the context of newsfeed stories, such as in banner ads or in highly visible areas of the member's home screen.

At some point in its operation, the social networking website 100 obtains an interactive social ad to display on the website. FIG. 1 illustrates a process in which an interactive social ad is generated for one of the friends of the member using the engagement interface generation process described above. To generate an interactive social ad for one of the member's friends, the website 100 accesses the action log 160 and a database of ad requests 115. The database of ad requests 115 include a number of requests that define criteria for creating an interactive social ad. Using the ad requests 115 and the action log 160, the website 100 applies a social ad generation algorithm 170 to create one or more interactive social ads tailored for the particular friend. Each generated interactive social ad comprises an advertising message that communicates a message about at least one member action from the action log 160 and that requests at least one action from the member's friends.

In one embodiment, the interactive social ad communicates a message about the actions of some number of friends of the member. For example, a member may receive a message like: "Three of your friends have added 'Dark Knight: Midnight Showing' to their calendars." The advertising message may also include additional content from the advertiser. The advertising message is communicated to the friend, for example as a message on the friend's home page, in an email message, in a list or newsfeed of other advertising messages and stories describing various actions taken, or any other electronic communication medium. FIGS. 11C-D illustrate another example of an interactive social ad, where the advertising message 1135 indicates that "12 of your friends received gifts." The social ad generation algorithm 170 is described in more detail in U.S. application Ser. No. 12/193,702, "Social Advertisements and Other Informational Messages, and Advertising Model for Same," filed Aug. 18, 2008, incorporated by reference herein.

Syndication of Engagement Interface Advertising Outside the Social Network

Embodiments of the engagement interfaces described above are presented to a member of a social network by a web page of the social network. However, engagement interfaces may also be presented on external systems, such as third party websites and enterprise systems. For example, while using or accessing an external system in communication with the social network, a member of the social network may be presented with the same or a similar engagement interface as described above in connection with engagement interfaces presented on the social network. Engagement interfaces are thus "syndicated" outside of the social network by one or more external systems.

Syndication of engagement interfaces on external systems may comprises a social network communicating the engagement interfaces to one or more external systems, which then present the engagement interface to a member of the social network. The communications between the social network and an external interface may be implemented in various ways, and one technique of implementing communication between a social network and an external system is described in U.S. application Ser. No. 12/324,761, titled "Leveraging a Social Graph from a Social Network for Social Context in Other Systems," filed Nov. 26, 2008, incorporated by reference herein. External systems may use these techniques to access information about members of the social network and their connections, and then to present engagement interfaces outside the social network. In this way, advertisers may communicate with members of the social network while they are on the external system. Syndication of engagement interfaces also enables members of a social network to modify objects within a social network even when browsing a website or otherwise accessing the external system outside of the social network.

In one embodiment, an external system may syndicate an engagement interface by first determining whether a user communicating with the external system is a member of the social network. If the user is a member of the social network, the external system may receive an engagement interface from the social network and presenting the engagement interface to the member of the social network.

As described above, the engagement interface may comprise a call to action and a link to perform the action within the social network. From the external system, a member may respond to the call to action by selecting the link to perform the action within the social network via the engagement interface. Because the external system and the social network communicate with each other, the engagement interface, responsive to a selection of the link, modifies objects in the social network associated with the call to action, as described above. After the objects within the social network are modified, the engagement interface is refreshed on the external system to indicate that the action was successful.

In this way, the member may engage with and perform actions within the social network even while using an external system outside the social network. This increases member engagement within the social network by providing more opportunities to interact with the social network.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network website, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
generating and storing a plurality of engagement interfaces targeting a plurality of users of a social networking system, each engagement interface comprising a call to action and a link to perform the action in the social networking system, the action modifying an object in the social networking system, the plurality of engagement interfaces generated and stored prior to providing the engagement interfaces to users of the social networking system;
receiving targeting criteria for one or more of the engagement interfaces;
responsive to a request for content from a user of the social networking system, selecting an engagement interface from the plurality of engagement interfaces for the user based at least in part on whether the user meets the targeting criteria for the selected engagement interface;
sending the requested content in a webpage comprising the selected engagement interface for display to the user;
receiving a request by a user to perform the action within the social network system from within the selected engagement interface via the user's selection of the link in the selected engagement interface, wherein the action modifies the object associated with the selected engagement interface;
performing, by a computer processor, the action in the social networking system according to the user request made from within the selected engagement interface; and
providing an indication for display to the user within the selected engagement interface indicating that the action has been performed, without redirecting the user away from the webpage.

2. The method of claim 1, further comprising recording, in an action log, the action performed within the selected engagement interface as an action performed within the social networking system by the user.

3. The method of claim 1, wherein the object modified by the action is an event object, and the action is adding an event to the user's calendar.

4. The method of claim 1, wherein the object modified by the action is the selected engagement interface, and the action is playing media content associated with the selected engagement interface.

5. The method of claim 1, wherein the object modified by the action is the selected engagement interface, and the action is posting the selected engagement interface as a gift on a friend's profile.

6. The method of claim 1, wherein the object modified by the action is the selected engagement interface, the action rating the selected engagement interface.

7. The method of claim 1, wherein the object modified by the action is a user profile object, the action adjusting the user's affinity score for an interest associated with the selected engagement interface.

8. The method of claim 1, wherein the object modified by the action is a user profile object, the action denoting the user as a fan of a sponsored page.

9. The method of claim 1, wherein the object modified by the action is a page object, the action denoting the user as a fan of a sponsored page associated with the page object.

10. The method of claim 1, wherein the object modified by the action is a user profile object, the action denoting a user's desire to perform a physical act.

11. The method of claim 1, wherein the object modified by the action is a wish list object, the action denoting a user's desire to perform a physical act associated with the wish list object.

12. The method of claim 1, wherein the object modified by the action is a poll answer object, the action answering a poll question associated with the poll answer object.

13. The method of claim 1, wherein the object modified by the action is an application object, the action joining a cause associated with the application object.

14. The method of claim 1, wherein the object modified by the action is the selected engagement interface, the action commenting on the selected engagement interface.

15. The method of claim 1, wherein the object modified by the action is an application object, the action playing a game associated with the application object.

16. The method of claim 1, wherein the object modified by the action is an application object, the action uploading a media file to be associated with the application object.

17. The method of claim 1, wherein the object modified by the action is an application object, the action sending gift currency to a friend via the application object.

18. The method of claim 1, wherein the selected engagement interface is a social ad.

19. The method of claim 1, wherein the content is requested from an external system in communication with the social networking system.

20. The method of claim 1, wherein the content comprising the selected engagement interface is sent to the user from an external website that is outside the social networking system.

21. A system comprising:
a processor;
a memory;
an engagement interface generator module executed by the processor on an ad server configured to generate a plurality of engagement interfaces, each engagement interface comprising a call to action and a link to perform the action in the social networking system, the action modifying an object in the social networking system, the plurality of engagement interfaces generated prior to providing the engagement interfaces to users of the social networking system; and
a database for receiving targeting criteria for one or more of the engagement interfaces;
a web server communicatively coupled to the ad server, responsive to a request for content from a user of the social networking system, configured to:
select an engagement interface from the plurality of engagement interfaces for the user based at least in part on whether the user meets the targeting criteria for the selected engagement interface;
send the requested content in a webpage comprising the selected engagement interface from the server for display to the user;
receive a request by a user to perform the action within the social network system from within the selected engagement interface, via the user's selection of the link in the selected engagement interface, wherein the action modifies the object associated with the selected engagement interface;
perform the action in the social networking system according to the user request made from within the selected engagement interface; and
provide an indication for display to the user within the selected engagement interface indicating that the action has been performed, without redirecting the user away from the webpage.

22. The system of claim 21, wherein the web server is further configured to:
refresh the selected engagement interface on the content to indicate that the action has been performed.

23. The system of claim 21, wherein the web server is an external system outside of the social networking system.

24. The system of claim 23, wherein the web server is further configured to communicate to the social networking system a user selection of the link on an engagement interface to perform an action within the social networking system.

25. A computer program product having a non-transitory computer readable medium having a computer program embodied therein, the computer program causing a processor to perform steps comprising:
generating a plurality of engagement interfaces targeting a plurality of users of a social networking system, each engagement interface comprising a call to action and a link to perform an action in the social networking system, wherein the action modifies an object in the social networking system associated with the engagement interface, the plurality of engagement interfaces generated prior to providing the engagement interfaces to users of the social networking system;
receiving targeting criteria for one or more of the engagement interfaces;
selecting, responsive to a request for content from a user of the social networking system, an engagement interface from the plurality of engagement interfaces for the user based at least in part on whether the user meets the targeting criteria for the selected engagement interface;
sending the requested content in a webpage comprising the selected engagement interface,
receiving a request by a user to perform the action within the social network system from within the selected engagement interface via the user's selection of the link in the selected engagement interface,
performing the action in the social networking system according to the user request made from within the selected engagement interface, and
providing an indication for display to the user within the selected engagement interface indicating that the action has been performed, without redirecting the user away from the webpage.

26. The computer program product of claim 25, wherein the computer program further causes the processor to:
refresh the selected engagement interface on the content to indicate that the action has been performed.

27. The computer program product of claim 25, wherein the engagement interface display module is an external system outside of the social networking system.

28. The computer program product of claim 27, wherein the computer program further causes the processor to communicate to the social networking system a user selection of the link on an engagement interface to perform the action within the social networking system.

* * * * *